United States Patent
Ma et al.

(10) Patent No.: US 12,177,340 B2
(45) Date of Patent: Dec. 24, 2024

(54) METHOD AND APPARATUS FOR IMPLEMENTING PRIVACY AMPLIFICATION IN QUANTUM KEY DISTRIBUTION

(71) Applicant: TSINGHUA UNIVERSITY, Beijing (CN)

(72) Inventors: Xiongfeng Ma, Beijing (CN); Yizhi Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/689,140

(22) PCT Filed: Jul. 5, 2022

(86) PCT No.: PCT/CN2022/103967
§ 371 (c)(1),
(2) Date: Mar. 5, 2024

(87) PCT Pub. No.: WO2023/040427
PCT Pub. Date: Mar. 23, 2023

(65) Prior Publication Data
US 2024/0340171 A1    Oct. 10, 2024

(30) Foreign Application Priority Data
Sep. 17, 2021 (CN) .......................... 202111094031.4

(51) Int. Cl.
*H04L 9/08* (2006.01)
*H04L 9/06* (2006.01)

(52) U.S. Cl.
CPC .......... *H04L 9/0852* (2013.01); *H04L 9/0643* (2013.01)

(58) Field of Classification Search
None
See application file for complete search history.

(56) References Cited

U.S. PATENT DOCUMENTS 11,095,439 B1    8/2021  Vakili
2013/0315395 A1*  11/2013  Jacobs .................. H04L 9/0852
                                         380/278
(Continued)

FOREIGN PATENT DOCUMENTS

CN    105553648 A    5/2016
CN    108599934 A *  9/2018  ........... H04L 9/0819
(Continued)

OTHER PUBLICATIONS

International Search Report for PCT/CN2022/103967 mailed on Sep. 23, 2022.

*Primary Examiner* — Taghi T Arani
*Assistant Examiner* — Joshua Raymond White
(74) *Attorney, Agent, or Firm* — Birch, Stewart, Kolasch & Birch, LLP

(57) ABSTRACT

Disclosed are a method and an apparatus for implementing privacy amplification in quantum key distribution. Participants of the quantum key distribution include a first participant and a second participant, which share a first key pool including at least one key. The method is executed on a terminal of either of the first and second participants, and includes: acquiring an auxiliary string to be used in current privacy amplification processing, wherein the auxiliary string is determined based on a seed key determined from the first key pool and a first Hash function agreed with the other participant; acquiring, in a stream way, at least one first bit in a first key subjected to information reconciliation; and performing a preset inter-bit operation between the at least one first bit and bits at corresponding positions in the auxiliary string to obtain at least one second bit for forming a privacy-amplified second key.

11 Claims, 3 Drawing Sheets

(56) References Cited

U.S. PATENT DOCUMENTS

| | | | | |
|---|---|---|---|---|
| 2016/0149700 A1* | 5/2016 | Fu | ................ | H04L 9/0858 380/278 |
| 2020/0092089 A1* | 3/2020 | Takahashi | ............. | H04L 9/0852 |

FOREIGN PATENT DOCUMENTS

| | | | | | |
|---|---|---|---|---|---|
| CN | 109756329 A | | 5/2019 | | |
| CN | 112039657 A | * | 12/2020 | ........... | H04L 9/0819 |
| CN | 113810175 A | | 12/2021 | | |

* cited by examiner

METHOD AND APPARATUS FOR IMPLEMENTING PRIVACY AMPLIFICATION IN QUANTUM KEY DISTRIBUTION

CROSS-REFERENCE TO RELATED APPLICATIONS

This application claims priority to Chinese Patent Application No. 202111094031.4, entitled "METHOD AND APPARATUS FOR IMPLEMENTING PRIVACY AMPLIFICATION IN QUANUM KEY DISTRIBUTION" and filed with the Chinese Patent Office on Sep. 17, 2021, the entire content of which is incorporated herein by reference.

TECHNICAL FIELD

The present invention relates to the field of quantum communication, and in particular to a method and an apparatus for implementing privacy amplification in quantum key distribution.

BACKGROUND ART

Quantum key distribution (QKD) technology is developed to ensure the security of communication by virtue of the properties of quantum mechanics, whereby both communicating parties can generate and share a random and secure key to encrypt and decrypt messages. It has a wide range of applications in fields such as practical cryptography, information security and national defense, as well as in various secure communication environments. A quantum key distribution process can usually include two sections: quantum operation and data post-processing. Here, the data post-processing can further include two sections: information reconciliation and privacy amplification. The former is mainly used to ensure that each user holds the same key, i.e., key consistency. The latter is mainly used to prevent a potential eavesdropper from acquisition of key information, i.e., ensuring key security.

At present, the commonly used privacy amplification scheme is to acquire the final key in the sense of information-theoretic security by the method of selecting a matrix that is dual to an error correction code, and applying the matrix to a key string subjected to information reconciliation to thus shorten the key string. However, this scheme requires accumulating a sufficiently long input key string before proceeding with a single processing. In many scenarios, for example, in satellite-based quantum key distribution, such a privacy amplification scheme encounters problems of low efficiency and impracticability, and may also bring about the problem of error spreading during processing.

Hence, there is a need for a new privacy amplification scheme.

SUMMARY OF THE INVENTION

Embodiments of the present invention provide a method and an apparatus for implementing privacy amplification in quantum key distribution. With the method, an initial key can be received and processed bit by bit during privacy amplification, without the accumulation of a sufficiently long input key string before processing, thereby improving the time efficiency of the processing. Meanwhile, the method also solves the problem of erroneous bit spreading during privacy amplification in the existing scheme.

To solve the above technical problem, the present invention employs the following technical solutions. In a first aspect, a method for implementing privacy amplification in quantum key distribution is provided, wherein participants of the quantum key distribution include a first participant and a second participant, which share a first key pool including at least one key, and the method is executed on a terminal of either of the first and second participants, and includes:

determining an auxiliary string to be used in current privacy amplification processing based on a seed key determined from the first key pool and a first Hash function agreed with the other participant;

acquiring, in a stream way, at least one first bit in a first key subjected to information reconciliation; and performing a preset inter-bit operation between the at least one first bit and corresponding bits in the auxiliary string to obtain at least one second bit for forming a privacy-amplified second key.

Preferably, the step of determining the auxiliary string to be used in the current privacy amplification processing includes:

determining the seed key from the first key pool, the seed key having a length that is determined according to the number of unsecure bits in the first key; and acquiring the auxiliary string by applying the first Hash function to the seed key, the auxiliary string having a length that is equal to a length of the first key.

Preferably, the first participant and the second participant further share a Hash function library; and the first Hash function agreed with the other participant includes a first Hash function predetermined from the Hash function library.

Preferably, the preset inter-bit operation is an XOR operation.

Preferably, the number of unsecure bits in the first key is determined based on a quantum operation in the quantum key distribution.

Preferably, the step of determining the seed key from the first key pool includes:

determining the seed key from the first key pool according to information that is released by the other participant and corresponds to the seed key.

Alternatively, the step of determining the seed key from the first key pool further includes:

releasing, to the other participant, information corresponding to the seed key.

Preferably, the first Hash function agreed with the other participant is implemented based on a Hash matrix, which is acquired by a process including:

determining an auxiliary key from the first key pool, and generating the Hash matrix based on the auxiliary key and an agreed error correction code, the Hash matrix having a dimension of k*n, with n being the length of the first key and k being the number of unsecure bits included in the first key; and acquiring the auxiliary string by applying the first Hash function to the seed key includes:

converting the seed key into a first row vector; and acquiring a second row vector by post-multiplying the Hash matrix by the first row vector, and converting the second row vector into the auxiliary string.

Preferably, the method further includes:

saving the second key to the first key pool.

Preferably, the first participant and the second participant sharing the first key pool includes: the first participant and the second participant each have a local backup of the first key pool; and determining the seed key from the first key pool includes:
determining the seed key from the local backup of the first key pool.

In a second aspect, an apparatus for implementing privacy amplification in quantum key distribution is provided, wherein participants of the quantum key distribution include a first participant and a second participant, which share a first key pool including at least one key, and the apparatus is implemented on a terminal of either of the first and second participants, and includes:

an auxiliary string determining unit configured to determine an auxiliary string to be used in current privacy amplification processing based on a seed key determined from the first key pool and a first Hash function agreed with the other participant;

a key acquiring unit configured to acquire, in a stream way, at least one first bit in a first key subjected to information reconciliation; and a privacy amplifying unit configured to perform a preset inter-bit operation between the at least one first bit and corresponding bits in the auxiliary string to obtain at least one second bit for forming a privacy-amplified second key.

In a third aspect, a computer-readable storage medium storing a computer program is provided, wherein the computer program, when executed in a computer, enables the computer to execute the method described in the first aspect.

In a fourth aspect, a computing device is provided. The computing device includes a memory and a processor, wherein the memory stores an executable code, and the processor, when executing the executable code, implements the method described in the first aspect.

BRIEF DESCRIPTION OF THE DRAWINGS

To describe the technical solutions in the embodiments of the present invention more clearly, the following briefly introduces the accompanying drawings required for describing the embodiments. Obviously, the accompanying drawings in the following description show merely some embodiments of the present invention, and a person of ordinary skills in the art may still derive other drawings from these accompanying drawings without creative efforts.

DETAILED DESCRIPTION OF THE INVENTION

In order to make the objects, technical solutions and advantages of the embodiments of the present invention more clear, a clear and complete description will be made to technical solutions of the present invention in conjunction with the accompanying drawings for the embodiments of the present invention. Obviously, the described embodiments are some instead of all of the embodiments of the present invention. Based on the embodiments detailed in the present description, other embodiments obtained by those of ordinary skills in the art without creative labor should fall within the protection scope of the present invention.

For the convenience of setting forth the spirit and basic principle of the present invention, it is first given a brief description of the existing privacy amplification scheme in quantum key distribution and the problems thereof.

The quantum key distribution QKD process may generally include a quantum operation stage and a data post-processing stage. In the quantum operation stage, for example, two participants (or users, for example, Alice and Bob) distribute quantum states therebetween through physical methods and measure the same to acquire initial keys. Depending on a QKD protocol, the quantum state may be distributed and measured in different ways. However, the initial keys held by Alice and Bob may have the following problems: first, during the distribution and measurement of the quantum state, the initial keys held by the two are not exactly the same, for example, because instruments used are not completely accurate or are affected by environmental noise; and second, the initial keys are not completely kept confidential due to the possibility of eavesdroppers (for example, Eve) who may acquire the information of the key by illegal means, during the quantum operation.

As a result, in order to acquire the same and confidential final key, each participant needs to perform data post-processing, the stage of which may typically include two sections: information reconciliation and privacy amplification. Here, similar to a classical error correction process, an information reconciliation process may consume some existing keys shared between the participants (or say, the randomness shared between users), such that the initial keys held by Alice and Bob become completely the same; and the privacy amplification is intended to delete information possibly known by the eavesdropper in the initial keys, such that the acquired final keys are kept completely confidential to people other than the participants (or say, the final key is a key with information-theoretic security).

Figure 1:
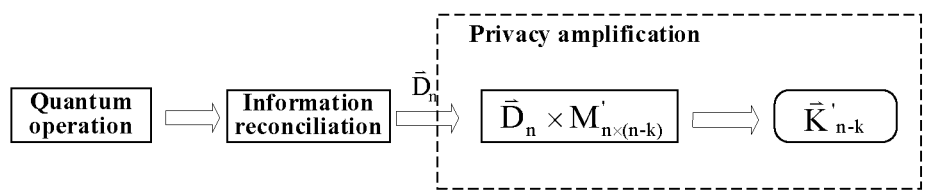
FIG. 1 is a schematic diagram showing the principle of an existing method for implementing privacy amplification in quantum key distribution according to an embodiment of the present invention.

At present, a widely used privacy amplification scheme includes the following process. After information reconciliation, both participants perform a Hash operation on their reconciliated key string using an agreed Hash function (for example, Alice randomly selects a Hash function and sends it to Bob by means of a common classical channel) and acquire a final key. In practice, Hash functions based on Toeplitz matrix are extensively used. FIG. 1 is a schematic diagram showing the principle of an existing method for implementing privacy amplification in quantum key distribution. For example, both participants may estimate the ratio $h(e_p)$ of information that may possibly be leaked from the initial key, then acquire the number k (which may be obtained based on $nh(e_p)$, with n being the length of the initial key) of bits that may possibly be leaked from the initial key, and then select an error correction code based on this ratio to obtain a corresponding Hash matrix, with a row/column ratio of (n:k). Then, a dual matrix of this Hash matrix is selected as a privacy amplification matrix M' (with a row/column ratio of n:n−k). Accordingly, initial keys subjected to information reconciliation are continuously received, until the whole initial key $\vec{D}$ with the length of n is obtained (the symbol $\rightarrow$ indicates a vector, and $\vec{D}$ is the vectorized representation of the initial key). Finally, the privacy amplification matrix is performed on the accumulated initial key by means of matrix multiplication to acquire a final key $\vec{K}_{n-k}$ with the length of n−k.

The existing scheme has the following problems in practical use: first, in this scheme, in order to improve the ratio of the final key to the initial keys, i.e., to ensure the efficiency of privacy amplification, it is typical to accumulate a sufficient number (for example, in an order of megabit) of information-reconciliated initial keys before a single privacy amplification process. In a scenario where the initial keys are acquired at low speed or unstably, it takes a long waiting time to obtain the final key. For example, in a satellite-based quantum key distribution protocol, sufficient data need to be accumulated by means of multiple orbits of a satellite before single round of privacy amplification, since quantum signals can be transmitted only when the satellite can be "seen" through the clear atmosphere layer from a ground station. However, such a delay may last for several days since the atmospheric conditions are often unpredictable. Second, during the above accumulation of the initial keys, effective operation cannot be performed for most of the time, resulting in low utilization efficiency of time. Third, as described earlier, it is necessary to accumulate a sufficient number of information-reconciliated initial keys before a single privacy amplification process. Accordingly, the privacy amplification matrix used in the single privacy amplification process is also very huge. It is technically difficult to input such a large amount of data into a computing module for computation. Fourth, the process of information reconciliation has a certain probability of failure. That is, the information-reconciliated initial keys held by both participants may be not completely the same with error therein, and users may hardly identify the position of the error. Because the length m of the initial key in one round of information reconciliation is relatively short, making m«n, one round of privacy amplification will process the results of multiple rounds of information reconciliation. If there is an error in the result of one round of information reconciliation, due to the privacy amplification matrix acting on all the n bits and its linear nature in computation, the error will "spread" to all the n×k bits of output, leading to a great increase in the number of errors before the privacy amplification.

Figure 2:
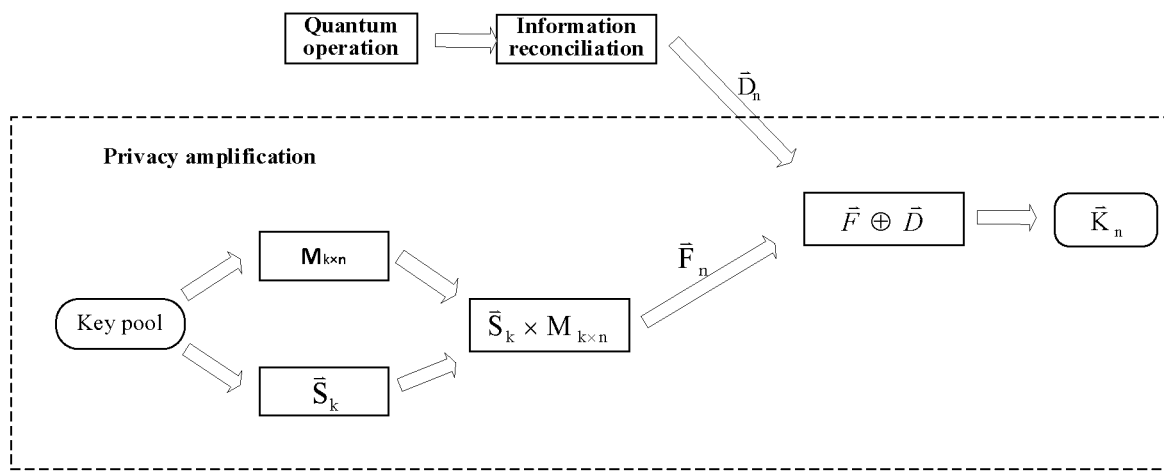
FIG. 2 is a schematic diagram showing the principle of a method for implementing privacy amplification in quantum key distribution according to an embodiment of the present invention.

In view of the above problems, the embodiments of the present specification provide a new privacy amplification scheme. This scheme may output one bit for secure final key once receiving one bit in the information-reconciliated key by consuming the randomness shared between users, without an additional increase of the computation complexity. Since the final key can be output bit by bit, i.e., in a stream way, this scheme is also called a stream-output privacy amplification scheme in the present specification. This scheme can effectively solve the above problems of the existing privacy amplification scheme. FIG. 2 is a schematic diagram showing the principle of a method for implementing privacy amplification in quantum key distribution according to an embodiment of the present invention. As shown in FIG. 2, this stream-output privacy amplification scheme is based on an existing shared key pool, in which some keys have been distributed among users in advance. It should be noted that this key pool is a shared resource that can be used in many cryptographic protocols, including an information reconciliation process. Therefore, in industry practice this key pool is usually an existing resource, rather than an additionally required resource.

First, in a scenario where an initial key of, for example, n bits is to be processed in a single round of privacy amplification, each participant may extract a certain amount of keys from the key pool, and generate the same Hash matrix M having the size of k×n (k indicates the number of bits that may possibly be leaked from the initial key, and may be determined based on a previous quantum operation process) based on the same error correction code. Each column of this Hash matrix may be regarded as a string (or column vector) consisting of {0,1}. Accordingly, this Hash matrix may be expressed as, for example, $M=(\vec{m}_1, \vec{m}_2, m_3, \ldots, \vec{m}_n)$, with $\vec{m}_1 \ldots \vec{m}_n$ indicating each column vector included therein. Depending on the embodiment, the keys consumption for generating the Hash matrix may be determined according to the specific error correction code.

Then, each participant may extract a seed key of another k bits from the shared key pool. For example, this process may be expressed as $\vec{S}=(\vec{s}_1, \vec{s}_2, \vec{s}_3, \ldots, \vec{s}_k)$, with $\vec{s}_1 \ldots \vec{s}_k$ indicating individual bits included in the seed key. Then, M is post-multiplied by $\vec{S}$ (as a row vector) to obtain an auxiliary string $\vec{F}=(f_1, f_2, f_3, \ldots, f_n)$ having a length of n, with $f_i = \vec{S} \cdot \vec{m}_i$, i=1,2,3, ..., n.

Finally, each participant may read the information-reconciliated initial key in a stream way. For example, this process is expressed as $\vec{D}=(d_1, d_2, d_3, \ldots, d_n)$, with $d_1 \ldots d_n$ indicating individual bits included in the initial key. For example, an XOR operation is performed on the initial key and the auxiliary string to obtain the privacy-amplified final key $\vec{K}=(k_1, k_2, k_3, \ldots, k_n)$ having a length of n. Here, $k_i = d_i \oplus f_i$, i=1,2,3, ..., n, with $\oplus$ indicating the XOR operation (or called modulo 2 addition). This final key is completely kept confidential to third parties other than respective participants, or say, it is a key with information-theoretic security.

This method shows the following advantages in terms of privacy amplification. In one aspect, the initial keys can be acquired in a stream way, so that the acquired initial key parts can be processed immediately, and the processing results of individual processes are then combined to obtain the final key. Hence, it is unnecessary to accumulate the whole initial keys before privacy amplification, which improves the time efficiency of processing. In another aspect, during the privacy amplification, the error bit in the initial keys only affects the corresponding bit, rather than additional bits, in the final key. That is to say, error spreading is prevented.

Figure 3:
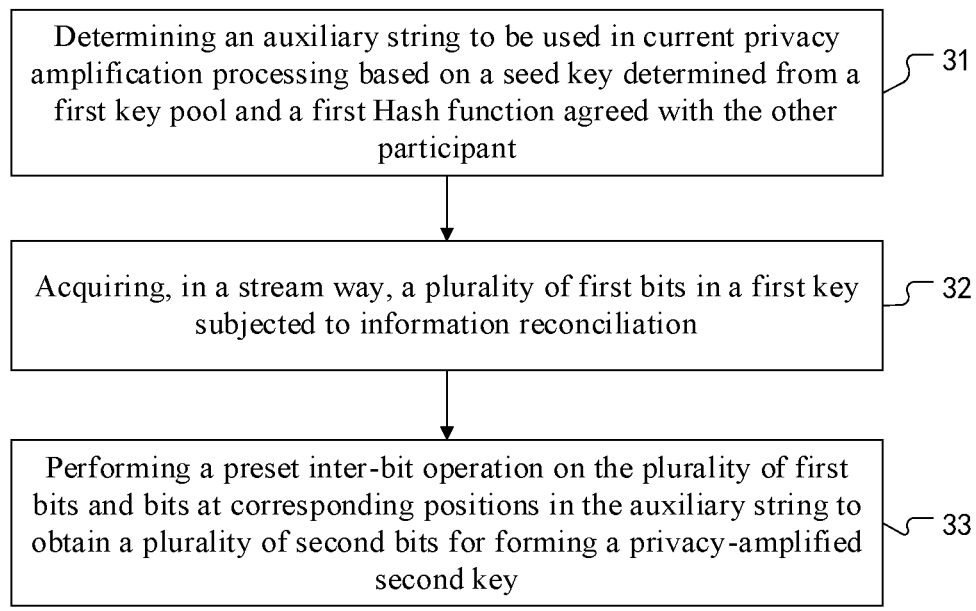
FIG. 3 is a flowchart of a method for implementing privacy amplification in quantum key distribution according to an embodiment of the present invention.
Figure 4:
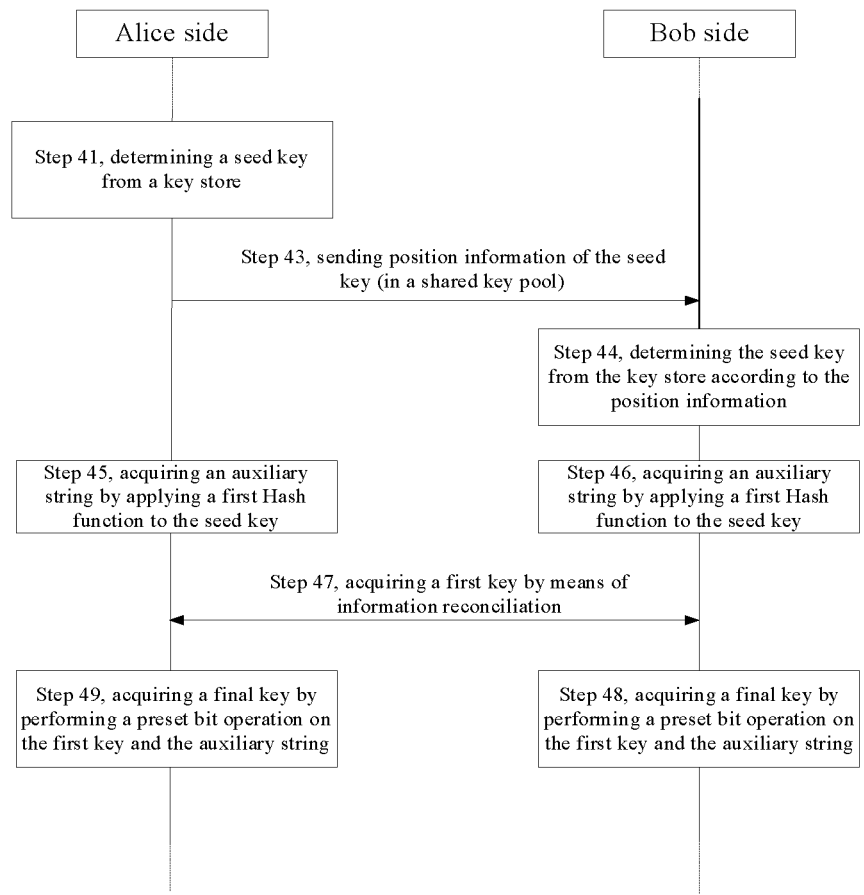
FIG. 4 is a flowchart of a method for implementing privacy amplification in quantum key distribution according to another embodiment of the present invention.

FIG. 3 is a flowchart of a method for implementing privacy amplification in quantum key distribution according to an embodiment of the present invention. Participants of the quantum key distribution include a first participant and a second participant, which share a first key pool including at least one key. The method is executed on a terminal of either of the first and second participants. As shown in FIG. 4, the method at least includes the following steps:

step 31, determining an auxiliary string to be used in current privacy amplification processing;

step 32, acquiring, in a stream way, at least one first bit in a first key subjected to information reconciliation; and step 33, performing a preset inter-bit operation between the at least one first bit and corresponding bits in the auxiliary string to obtain at least one second bit for forming a privacy-amplified second key.

First, in step 31, the auxiliary string to be used in the current privacy amplification processing is determined based on a seed key determined from a first key pool and a first Hash function agreed with the other participant.

In this step, since the first key pool is shared by each participant and the first Hash function is agreed by each participant, the seed key and the first Hash function are known by each participant, but unknown by a third party other than the participants. Further, each participant terminal may acquire the same auxiliary string based on the same seed key and first Hash function.

The participant terminal is not intended to exclusively refer to a terminal device of a participant for, for example, a workstation, but may refer to any computing device of the participant for performing computational processing. It includes but is not limited to a server, a workstation, a minicomputer, a mobile processing terminal or the like, and may also refer to a plurality of participant's computing devices working coordinately. Since the quantum key distribution process may include the quantum operation and the post-processing, in some embodiments, the terminals of the participants may also include a quantum-classic hybrid server, which includes a quantum processor and a classic processor. The quantum processor may be configured to execute the quantum operation, and the classic processor may be configured to execute the post-processing, i.e., privacy amplification.

Depending on the embodiment, the auxiliary string may be acquired in different ways, which is not limited in the present specification. For example, in an embodiment, the auxiliary string may be acquired by the following process: determining the seed key from the first key pool, the seed key having a length determined according to the number of unsecure bits in the first key; and acquiring the auxiliary string by applying, to the seed key, the first Hash function agreed with the other participant, with the auxiliary string having a length equal to that of the first key.

Here, as described earlier, the whole quantum key distribution process generally comprises a quantum operation process and a data post-processing process, which further includes information reconciliation and privacy amplification. According to an embodiment, the length of the first key (i.e., the number of all bits included in the first key) processed by the current round of privacy amplification and the number of unsecure bits in the first key (i.e., the number of bits that may be eavesdropped) may be determined in the quantum operation process of the quantum key distribution between the individual participants. Therefore, in a particular embodiment, the number of unsecure bits in the first key may also be determined based on the quantum operation in the quantum key distribution.

Depending on the embodiment, the first key pool may be shared in different ways. For example, in an embodiment, the individual participants may have a local backup of the first key pool, respectively. Thus, the individual participants may each determine a seed key from the local backup of the first key pool.

Depending on the embodiment, the first Hash function may be agreed in different ways, or the agreed first Hash function may be different in various embodiments, which is not limited in the present specification. For example, in an embodiment, the individual participants may also share a Hash function library, and may predetermine the first Hash function from the Hash function library.

In another embodiment, the first Hash function may be implemented based on a Hash matrix, which may be acquired by the following process: determining an auxiliary key from the first key pool, and generating the Hash matrix based on the auxiliary key and an agreed error correction code, the Hash matrix having a dimension of k*n, with n being the length of the first key and k being the number of unsecure bits included in the first key. In different examples, different error correction codes may be used, which is not limited in the present specification. In an embodiment, the specific way of using the Hash matrix is to convert the seed key into a first row vector, post-multiply the hash matrix on the first row vector to obtain a second row vector, and convert the second row vector into the auxiliary string.

From the above embodiment, it can be seen that the Hash matrix may be generated based on the error correction code, the number of unsecure bits, and the length of the initial key. In practice, the error correction code, the number of unsecure bits or other parameters may be determined depending on the actual quantum system. Due to the stability of the quantum system in actual production, these parameters may not be changed in multiple privacy amplification processes. Therefore, in some embodiments, a same Hash matrix may be used in multiple rounds of privacy amplification. In other cases, the actual quantum system may change to a certain extent in different privacy amplification processes. Therefore, in some other embodiments, these parameters may also be determined according to the worst condition of the actual system (for example, the Hash matrix may be generated based on the greatest possible number of unsecure bits). In this way, the generated Hash matrix is also made available in multiple rounds of privacy amplification.

Depending on the embodiment, the first Hash function may be implemented by means of software and hardware. For example, in an embodiment, the first Hash function may be specifically implemented by a Hash circuit shared between the participants.

Then, in step 32, at least one first bit in a first key subjected to information reconciliation is acquired in a stream way.

In this step, the first key is a key processed by the current privacy amplification. As described earlier, after the quantum operation stage is completed in the quantum key distribution, information reconciliation and privacy amplification are generally required. Here, the information reconciliation is a way of error correction and may ensure the agreement of keys shared by the individual participants in the quantum distribution. The information reconciliation process is generally completed based on a common channel, and may be eavesdropped by a third party other than the respective participants to which the key is distributed. The privacy amplification is a method for reducing or removing key information eavesdropped by the third party. This part of key information may be either eavesdropped during key transmission in the quantum operation stage, or acquired during information reconciliation later performed by means of the common channel. Therefore, the privacy amplification is typically performed after information reconciliation. That is to say, the first key is typically acquired by the first and second participants by means of information reconciliation.

The first bit may be any bit in the first key. In this step, at least one bit in the first key is acquired in a stream way, and then may be processed in a subsequent step. The subsequent processing may be performed without waiting for the completion of the receiving of the whole first key.

Finally, in step 33, a preset inter-bit operation is performed between the at least one first bit and bits at corresponding positions in the auxiliary string to obtain at least one second bit for forming a privacy-amplified second key.

In this step, a bit operation, for example, XOR operation, may be performed between the several bits (first bits) in the first key as received in step 32 and the corresponding bits in the auxiliary string, to obtain several new second bits. Further, the second bits obtained from all the first bits in the first key may be combined to form the privacy-amplified final key (second key).

It should be noted that, to achieve better security, the quantity ratio of '0' bits to '1' bits in the second key is desired to reach 1:1. Therefore, in an embodiment, the preset inter-bit operation may be preferably an XOR operation. In another embodiment, the preset inter-bit operation may also be preferably an XNOR operation. The reason lies in that, when the input bits of the bit operation show an uniform distribution, the distribution of '0' and '1' in the output result acquired by executing for example the XOR or XNOR operation tends to reach 1:1.

Depending on the embodiment, the at least one bit may be one bit or multiple bits. The preset inter-bit operation may be a bit operation agreed between the individual participants. For example, in an embodiment, the individual participants agree on a first operation, which generates a two-bit output according to two two-bit inputs. In essence, it is to obtain the two output bits by, for example, changing the positions of the two bits of the first key and then performing the XOR operation between the resultant two bits and two bits of the auxiliary string. Table 1 shows a corresponding relation between input and output in the first operation.

TABLE 1

| Input and output in first operation | | | | | | | | | | | | | | | | |
|---|---|---|---|---|---|---|---|---|---|---|---|---|---|---|---|---|
| First key | 00 | | | | 01 | | | | 10 | | | | 11 | | | |
| Auxiliary string | 00 | 01 | 10 | 11 | 00 | 01 | 10 | 11 | 00 | 01 | 10 | 11 | 00 | 01 | 10 | 11 |
| Output | 00 | 01 | 10 | 11 | 10 | 11 | 00 | 01 | 01 | 00 | 11 | 10 | 11 | 10 | 01 | 00 |

In another embodiment, the individual participants may also agree on for example a second operation, which, for example, may be applied to three bits or more bits in pair. In essence, for example, it is to obtain an output result by selecting one from two input bit strings, changing the positions of individual bits in the selected string, and then performing XOR bit-wisely between the selected string and the other string. In various examples, the principle of changing the positions of bits may also be pre-agreed by the individual participants. For example, for a three-bit string expressed as 'a1a2a3', the result arising from changing the positions of bits may be, for example, 'a1a3a2' or 'a2a3a1' or the like as pre-agreed, in different examples.

In an embodiment, the final key (second key), after being obtained, may also be saved to the key pool, i.e., the first key pool, shared by the individual participants.

FIG. 4 is a flowchart of a method for implementing privacy amplification in quantum key distribution according to another embodiment of the present invention. In the embodiment shown in FIG. 4, one of the participants may determine the seed key from the first key pool, and then release the information corresponding to the seed key to the other participant. For example, such information may be the position of the determined seed key in the shared key pool. The other participant, after receiving the information corresponding to the above seed key, may determine the seed key from the first key pool according to the information corresponding to the seed key. Hence, the individual participants may obtain the same auxiliary string respectively according to the same seed key, and then obtain the same final key, respectively. As shown in FIG. 4, for example, an Alice-side terminal extracts a seed key from its local key pool (step 41), and then sends the position of the seed key in the key pool to, for example, a Bob-side terminal (step 43) by means of a common channel, thereby enabling the Bob side to acquire the same seed key from its local key pool according to this position (step 44). Then, the Alice-side and Bob-side terminals each acquire an auxiliary string according to their acquired seed key (steps 45 and 46, respectively). Finally, after acquiring the first key (step 47, which may correspond to step 31 in FIG. 3), the Alice-side and Bob-side terminals may perform a preset bit operation, for example XOR operation, on the first key and the auxiliary string, respectively, to obtain the final key (steps 49 and 48, respectively).

In summary, the use of the method for implementing privacy amplification according to the embodiments of the present invention shows the following advantages. First, the operation may be conducted based on the initial keys acquired in a stream way to then obtain corresponding output results, thereby achieving the effect of stream output, without the accumulation of data of the initial keys. Second, the auxiliary string is acquired independent of the acquisition of the initial key and may be computed separately. For example, in a scenario such as satellite-based QKD, the computation may be performed in advance by virtue of the free time unavailable for communication, which greatly improves the utilization efficiency of time. Third, the granularity of each processing is one bit in the initial key, and thus, in case of an error occurring to any initial bit, the error only occurs to the bit corresponding to the erroneous initial bit, without affecting other bits.

Figure 5:
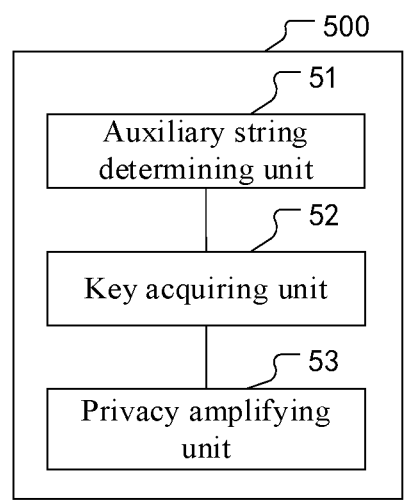
FIG. 5 is a structural diagram of an apparatus for implementing privacy amplification in quantum key distribution according to an embodiment of the present invention.

According to an embodiment in a further another aspect, an apparatus for implementing privacy amplification in quantum key distribution is provided. FIG. 5 is a structural diagram of an apparatus for implementing privacy amplification in quantum key distribution according to an embodiment of the present invention. Participants of the quantum key distribution include a first participant and a second participant, which share a first key pool including a plurality of keys, and the apparatus is implemented on a terminal of either of the first and second participants. As shown in FIG. 5, the apparatus 500 includes:

an auxiliary string determining unit 51 configured to determine an auxiliary string used in current privacy amplification processing based on a seed key determined from the first key pool and a first Hash function agreed with the other participant;

a key acquiring unit 52 configured to acquire, in a stream way, at least one first bit in a first key subjected to information reconciliation; and a privacy amplifying unit 53 configured to perform a preset inter-bit operation between the at least one first bit and bits at corresponding positions in the auxiliary string to obtain at least one second bit for forming a privacy-amplified second key.

According to an embodiment in a further another aspect, a computer-readable medium storing a computer program is further provided. The computer, when running, executes the method described above.

According to an embodiment in a further another aspect, a computing device is further provided. The computing device includes a memory and a processor; the memory stores an executable code; and the processor, when executing the executable code, implements the method described above.

The specific embodiments of the present invention are described above. Other embodiments shall fall within the scope of the appended claims. In some cases, the operations and steps stated in the claims can be executed in an order different from that in the embodiments to achieve a desired result as well. In addition, the processes depicted in the accompanying drawings are not necessarily performed based on the illustrated specific order or continuous order to achieve the desired result. In some embodiments, multi-task processing and parallel processing are also possible or may be advantageous.

Those skilled in the art may be further ware of that the units and algorithm steps in each example described in conjunction with the embodiments disclosed herein may be implemented by using electronic hardware, computer software or a combination of the two. For a clear understanding of the interchangeability between the hardware and the software, the composition and steps of each example are described by function in general in the description above. Whether these functions are executed in a form of hardware or software depends on the specific application of the technical solution and design constraints. Those skilled in the art may implement the described functions by using different methods for each specific application, but such implementation should not be construed as exceeding the scope of the present invention.

The steps of the methods or algorithms described in conjunction with the embodiments disclosed herein may be implemented by using hardware, software modules executed by a processor, or a combination of the two. The software modules may be placed in a random-access memory (RAM), an internal memory, a read-only memory (ROM), an electric programmable ROM, an electric erasable programmable ROM, a register, a hard disk, a removable magnetic disk, a CD-ROM, or storage mediums in any other forms as commonly known in the technical field.

The objects, technical solutions and advantageous effects of the present invention are further illustrated in detail with the specific embodiments described above. It should be understood that the description above only involves the specific embodiments of the present invention and is not intended to limit the protection scope of the present invention. Any modifications, equivalent substitutions, improvements and the like made within the spirit and principle of the present invention should be construed as being included within the protection scope of the present invention.

The invention claimed is:

1. A method for implementing privacy amplification in quantum key distribution, wherein participants of the quantum key distribution comprise a first participant and a second participant, which share a first key pool comprising at least one key, and the method is executed on a terminal of a first participant, and comprises:
determining an auxiliary string to be used in current privacy amplification processing based on a seed key determined from the first key pool and a first Hash function agreed with the second participant, which comprises: determining the seed key from the first key pool, the seed key having a length that is determined according to a number of unsecure bits in a first key: and acquiring the auxiliary string by applying the first Hash function to the seed key, the auxiliary string having an auxiliary string length that is equal to a first key length of the first key;
wherein acquiring the auxiliary string by applying the first Hash function to the seed key comprises:
converting the seed key into a first row vector; and
acquiring a second row vector by post-multiplying a Hash matrix by the first row vector, and converting the second row vector into the auxiliary string;
acquiring, in a stream way, at least one first bit in the first key subjected to information reconciliation; and
performing a preset inter-bit operation between the at least one first bit and bits at corresponding positions in the auxiliary string to obtain at least one second bit for forming a privacy-amplified second key.

2. The method according to claim 1, wherein the first participant and the second participant further share a Hash function library; and
the first Hash function agreed with the other participant comprises a first Hash function predetermined from the Hash function library.

3. The method according to claim 1, wherein the preset inter-bit operation is an XOR operation.

4. The method according to claim 1, wherein the number of unsecure bits in the first key is determined based on a quantum operation in the quantum key distribution.

5. The method according to claim 1, wherein determining the seed key from the first key pool comprises:
determining the seed key from the first key pool according to information that is released by the second participant and corresponds to the seed key.

6. The method according to claim 1, wherein after determining the seed key from the first key pool, the method further comprises: releasing, to the second participant, information corresponding to the seed key.

7. The method according to claim 1, wherein the first Hash function agreed with the second participant is implemented based on the Hash matrix, which is acquired by a process comprising:
determining an auxiliary key from the first key pool, and generating the Hash matrix based on the auxiliary key and an agreed error correction code, the Hash matrix having a dimension of k*n, with n being the length of the first key and k being the number of unsecure bits comprised in the first key.

8. The method according to claim 1, further comprising saving the second key to the first key pool.

9. The method according to claim 1, wherein the first participant and the second participant sharing the first key pool comprises: the first participant and the second participant each having a local backup of the first key pool; and
determining the seed key from the first key pool comprises: determining the seed key from the local backup of the first key pool.

10. An apparatus for implementing privacy amplification in quantum key distribution, wherein participants of the quantum key distribution comprise a first participant and a second participant, which share a first key pool comprising a plurality of keys, and the apparatus is implemented on a terminal of the first participant, and comprises:
an auxiliary string determining unit configured to determine an auxiliary string to be used in current privacy amplification processing based on a seed key determined from the first key pool and a first Hash function agreed with the second participant, which comprises: to determine the seed key from the first key pool, the seed key having a length that is determined according to a number of unsecure bits in a first key; and to acquire the auxiliary string by applying the first Hash function to the seed key, the auxiliary string having an auxiliary string length that is equal to a first key length of the first key wherein acquiring the auxiliary string by applying the first Hash function to the seed key comprises:
converting the seed key into a first-row vector; and
acquiring a second-row vector by post-multiplying a Hash matrix by the first row vector, and converting the second row vector into the auxiliary string;

a key acquiring unit configured to acquire, in a stream way, at least one first bit in the first key subjected to information reconciliation; and a privacy amplifying unit configured to perform a preset inter-bit operation between the at least one first bit and bits at corresponding positions in the auxiliary string to obtain at least one second bit for forming a privacy-amplified second key.

11. A computing device, comprising a memory and a processor, wherein the memory stores an executable code, and the processor, when executing the executable code, implements the method according to claim 1.

\* \* \* \* \*